UNITED STATES PATENT OFFICE.

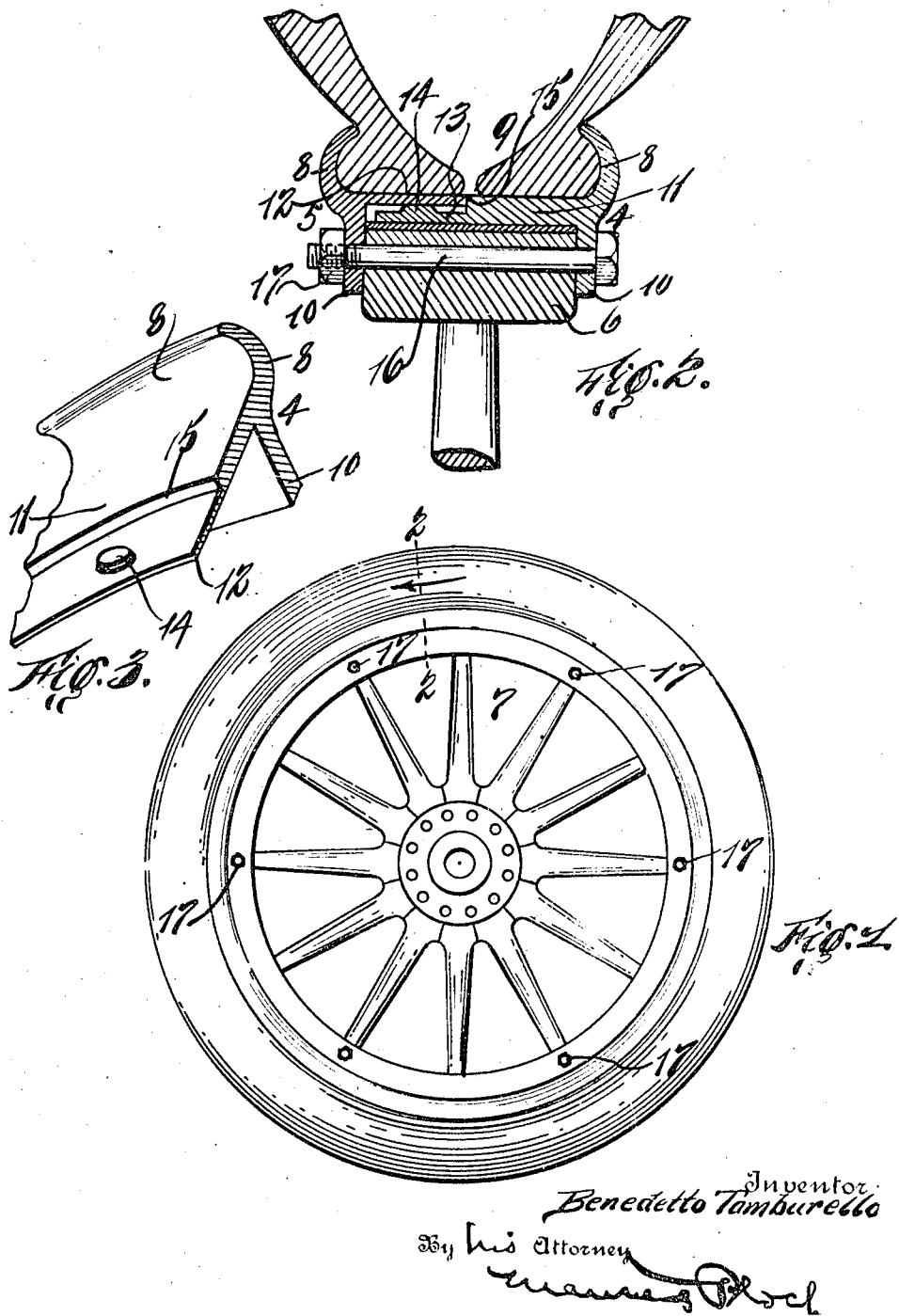

BENEDETTO TAMBURELLO, OF NEW YORK, N. Y.

WHEEL-RIM FOR PNEUMATIC TIRES.

1,289,958.  Specification of Letters Patent.  Patented Dec. 31, 1918.

Application filed July 22, 1918. Serial No. 245,984.

*To all whom it may concern:*

Be it known that I, BENEDETTO TAMBURELLO, a citizen of the United States of America, residing at New York city, county and State of New York, have invented certain new and useful Improvements in Wheel-Rims for Pneumatic Tires, of which the following is a full, clear, and exact description.

This invention relates to improvements in rims for securing tires to vehicle wheels, the object being to provide a rim which is semi-detachable, that is to say, one part of the rim removable from the wheel, the other part fixed, certain elements being provided to secure the removable portion of the rim as well as the fixed portion, to the felly of the wheel.

I will now proceed to describe my invention in detail, the novel features of which, I will point out in the claim, reference being had to the accompanying drawing forming part hereof, wherein:—

Figure 1 is a side elevation of a wheel equipped with my improved rim;

Fig. 2 is an enlarged cross sectional view, the section being taken on a line 2—2 in Fig. 1; and Fig. 3 is a fragmentary perspective view of the fixed member of the rim.

As herein embodied, my invention comprises a rim composed, in this instance, of two members 4 and 5, arranged to fit the felly 6 of a wheel 7. Each rim member 4 and 5 consists of a bead engaging flange 8, to engage the beading of a tire 9, a felly engaging flange 10 and annular plate portions 11 and 12 respectively. The plate portion 11 of the member 4 is reduced in thickness from the center thereof outwardly to its free edge as at 13, said reduced portion or auxiliary plate being provided with bosses 14, upon which the plate 12 of the rim member 5 rests. The combined thickness of the plate 12 of the rim member 8, boss 14 and auxiliary plate 13 of the rim member 5, will be equal to the thickness of the plate portion 11 of the said rim member 4. The reducing of the plate 11, to form the auxiliary plate 13, will provide a shoulder 15 against which the inner edge of the plate 12 of the rim member 5 will abut.

To secure the rim members to the felly of the wheel, I preferably employ bolts 16 having removable nuts 17, the nuts being located at the outer side of the felly of the wheel.

To remove the tire 9 from the wheel, it is but necessary to remove the nuts 17, slip the rim member 5 off the wheel, and pull the tire off. The bolts 16 will serve to hold the rim member 11 on the felly, after the nuts have been removed and rim member 5 detached. The bosses 14 act to brace the plate portion 12 of the rim member 5. I prefer to provide a number of these bosses, to support the member 5, instead of allowing th said plate portion 12 to rest upon the au..,iary plate 13 of the rim member 4. By this means, I am able to adequately support the rim member 12 with a minimum amount of contacting surface, which precludes the rusting of the parts together to an extent that would prevent the separation thereof.

What I claim as my invention is:

In combination with a wheel, a tire-rim consisting of a plate, a relatively thinner auxiliary plate carried thereby, bosses carried by said auxiliary plate, a second relatively thin plate adapted to rest upon the bosses of the auxiliary plate, the thickness of the relatively thin auxiliary plate, the height of the bosses thereon and the thickness of the plate which rests upon said bosses being equal to the thickness of the plate which carries the auxiliary plate above named, a tire engaging beading carried by each plate, a felly engaging flange also carried by each plate, and bolts passing through said flanges and the felly of the wheel.

Signed at New York city, N. Y., this 19 day of July, 1918.

BENEDETTO TAMBURELLO.

Witnesses:
EDWARD A. JARVIS,
MAURICE BLOCH.